United States Patent Office

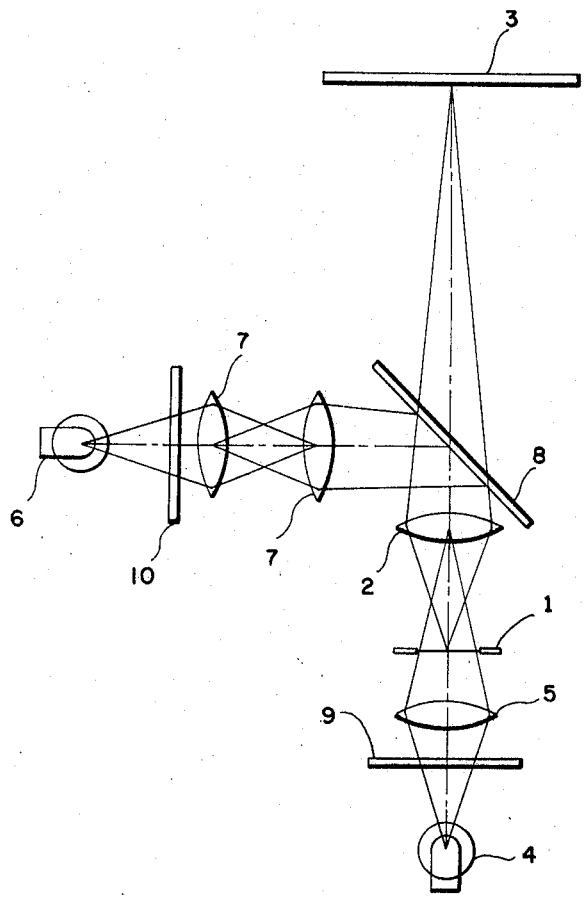

3,480,365
Patented Nov. 25, 1969

3,480,365
PHOTOGRAPHIC MATERIALS HAVING A PICTURE IMAGE WHICH MAY BE REVERSED OR VARIED WITH RESPECT TO THE CONTRAST THEREOF
Shingo Ooue, Hiroyuki Ueda, and Masakazu Hashiue, Ashigara-Kamigun, Kanagawa, Japan, assignors to Fuji Photo Film Co. Ltd., Tokyo, Japan
Filed Feb. 8, 1967, Ser. No. 614,643
Claims priority, application Japan, Feb. 9, 1966, 41/7,549
Int. Cl. G03b 27/32, 27/02, 27/76
U.S. Cl. 355—77    1 Claim

ABSTRACT OF THE DISCLOSURE

High silver content photo-sensitive material having a high specular reflectant and a high transmission density characteristics, particularly a method of polishing the surface of the photo-sensitive material after forming of an image thereon so as to present a specular reflectant, then controlling the ratio of light intensity between the transmission illumination light and the light reflected by the image itself.

BACKGROUND OF THE INVENTION

Previous to this invention, there have been available a number of apparatus or devices, such as a variable contrast enlarger using a flying spot tube, a printer or inversion viewer utilizing a television system, a printer or inversion viewer based on the principle of quenching phenomenon of fluorescent materials, and the like. These apparatus or devices above mentioned are, however, of complicated construction as well as expensive, and unfit for practical use as an enlarger because of low brightness of image and reduced sharpness of image, etc.

SUMMARY OF THE INVENTION

The present invention relates to photographic materials having a photographic picture image which may be reversed or varied with respect to the contrast thereof by means of an optical system, and a method of manufacturing the same.

In a case where a photographic image of a negative film is to be printed onto a photographic printing paper, a cinematographic positive film, etc., where a positive film is subjected to printing in order to make a duplicating negative film, or where a picture on a film for a slide or movie is projected on a screen, it has frequently been desired to vary the contrast of a picture image to obtain proper tone reproduction or a photograph or image of better tone or appearance over as specific range of density. In fact, there may generally be produced a picture image exhibiting an excessively high contrast with a development time lengthened too long. Or, on the contrary, there may be produced a picture image possessing a contrast too low with a period of development time excessively shortened.

There will be many obvious beneficial results in the art of automatic printing using a photographic printing paper, printing employing a movie film printer, etc., with easy manufacture of a photographic picture image whose contrast can simply be varied by virtue of a variable contrast printer of simple construction and being capable of yielding an image of high brightness, because it is impossible to change, in accordance with the contrast of the picture image, one photographic printing paper with the other with respect to the contrast, when an automatic printer using a roll paper is employed. Therefore, the image quanlity of a picture image resutling from automatic printing will be improved to a great extent, if the contrast of a picture image can optionally be varied by means of an optical sytsem of the printer. Further, it is so in the case of printing a positive film for movies.

DESCRIPTION OF THE DRAWINGS

The figure illustrates an optical system for projecting a photographic picture image manufactured in accordance with this invention onto a screen, after varying the contrast of said image.

DESCRIPTION OF THE PREFERRED EMBODIMENTS

The present invention is concerned with photographic materials having a photographic image exhibiting high reflectance at a portion of high density, said photographic materials being thereby suitably coupled with an apparatus comprising an optical system by which said photographic image is varied with respect to the contrast or reversed as the result of utilizing for image formation both transmitted light and refected light from the picture image on said photographic materials, and a method of forming such a photographic image thereon. The present invention is characterized by the fact that said photographic materials can easily be manufactured and put to practical use with the result of formation of a picture image having very high brightness. In accordance with this invention, it is also possible to carry out a so-called positive to positive photographic system as in the manner in which a photosensitive material is subjected to reversal development process, since a negative image on said photographic materials can be projected, printed or viewed into or as a corresponding positive image, and reversely, the contrast of the photographic image thereon can be varied over a certain range. In addition to this, the photographic image manufactured in accordance with this invention may favorably be used as a picture image for an inversion viewer, slide or movie.

The photographic image of this invention may be manufactured by the steps of preparing a photosensitive material which has a very high silver content, which means a very small amount of a binder (for example, gelatin) when compared with the amount of silver halide contained therein, subjecting the photosensitive material to photographic processings such as exposing it to light from an object or picture image to form a latent image and developing the latent image thus formed, and polishing the image thus developed to impart metallic gloss thereto. We have found that the photographic image thus produced and exhibiting metallic gloss has a higher reflectance in the character of a mirror surface at one portion having a higher transmission density than at the other having a lower transmission density. Judging on the foregoing fact, it may be concluded that a positive image can be produced by giving reflection illumination to such a picture image as yields a corresponding negative image upon being lightened with transmission illumination. Moreover, we have found that a picture image can be varied with respect to the contrast or reversed, if the picture image is lightened simultaneously with both transmission and reflection illuminations, and then the intensity of the former is changed relative to that of the latter, after the completion of each of image formations.

The manner in which a photographic picture of this invention is manufactured will now be more closely described, as follows:

A photosensitive material suitable for making thereon a picture image exhibiting metallic gloss may be prepared in the following manner: As stated hereinbefore, a photosensitive material which has a very high silver content, that is, a relatively large amount of silver halide when compared with that of a binder, is preferred. As for the preparation of a photosensitive material having a very high content of silver, here there are three possible ways:

The first is a method of preparing vacuum evaporated photographic materials, which comprises fusing silver halide under vacuum and then causing the molten mass of silver halide to deposit onto the surface of a transparent substrate after the vacuum evaporation thereof;

The second is a method of preparing photosensitive materials, which comprises blending an aqueous solution of metal or ammonium halides (for example, potassium bromide) with a solution containing silver nitrate, to precipitate crystalline silver halide, and then causing said crystalline substance to deposit onto the surface of transparent substrate. Said aqueous solution of metal or ammonium halides may be added, if necessary, with a small amount of gelatin. Alternatively, photosensitive materials having a very high content of sliver may also be prepared by the steps of adding a relatively large amount of gelatin to an aqueous solution of metal or ammonium halides, blending the resulting mixture with a solution containing silver nitrate to yield a silver halide emulsion, adding an agent for decomposing gelatin, such as enzyme and the like, to said emulsion to reduce the amount of gelatin, and finally coating the emulsion thus produced into the surface of a substrate; and The third method of preparing photosensitive materials having a very high content of silver comprises immersing an ordinary photosensitive material composed of silver halide in concentrated sulfuric acid, glacial acetic acid or the like, to chemically and selectively remove only the gelatin contained therein, and washing said photosensitive material thus treated with water, followed by drying, which is designated as the Shüman Method.

A photographic picture image exhibiting metallic gloss, in accordance with this invention, may be manufactured until one of said photographic materials having a very high content of silver and prepared by any of the three above methods is utilized to take a picture, and polished in the manner hereinafter described, after a series of photographic processings such as development, fixing, washing and drying.

Polishing of photosensitive materials may be conducted as follows: A picture image to be polished must be protected from being injured and from being stained with dirt. The variation range of contrast may become smaller owing to reduced transmission density of the picture image with a polishing loss to a great extent. In addition to this, said variation range may also become narrower if the degree of metallic gloss of the picture image is smaller, because the intensity of reflected light from the picture image is smaller. Hence it is necessary to employ a polishing process which can afford a high degree of metallic gloss to the picture image, while using an abrasive with which said polishing loss will be minimized. For this purpose, glass beads below 50 microns in diameter have been proved to be most favorable. Buffing with carborundum is unfit for this purpose because of a large polishing loss. Further, buffing with non-abrasive does not afford a high degree of metallic gloss thereto, although the polishing loss is small. The latter is, however, suitable from the view point of practical use. Surface rolling while employing a metal member having a smooth surface is adapted for obtaining a high degree of metallic gloss, but has a shortcoming that the picture image is liable to be injured, so that it cannot impart metallic gloss of high uniformity to the picture image. This working may, however, become suitable for practical use of the above defects are overcome, because the transmission density of the picture image is improved thereby. Furthermore, polishing with a finger is also fairly useful in practice.

In the figure there is shown an optical system for projecting a picture image 1 onto the surface of a photosensitive material for printing or screen 3 through a projection lens 2. The picture image 1 is lightened with transmission illumination from a light source 4 for transmission illuminating through a transmission illumination condenser lens 5 on the one hand, and simultaneously lightened with reflection illumination from a light source 6 for reflection illuminating through a reflection illumination system comprising condenser lenses 7, 7 and a half silvered mirror (alternatively, a member capable of reflecting light at one portion and allowing light to transmit therethrough at the other portion) 8. Each illumination system is provided with either light modulators 9, 10 or means for varying the intensity of light from each light source, thereby the ratio of transmission illumination level to reflection illumination level can be varied. As a light modulator, there may be exemplified a device comprising two optical wedges which are moved in the opposite direction, or a device comprising two sheets of polarizer whose azimuth angles can be varied respectively. In a case where an incandescent lamp is employed for use in the light sources 4, 6, together with means for varying electric potentials to be applied to each light source in order to vary the intensity of light, color of transmission illumination light is different from that of reflection illumination light, so that said optical system for carrying out the projection is advantageously provided with monochromatic filters to compensate the color of light, if color balance is required for.

The following description is intended to explain how the contrast of a secondary picture image formed upon projection is varied when transmission light and reflection light from a picture image to be projected are composed into one.

Now we should regard illumination of transmission illumination light and illumination of reflection illumination light measured in the picture plane as $E_T$ and $E_R$, respectively in the order described. Regarding the transmittance and reflectance of the picture image to light of incidence as T and R respectively, brightness of the picture image to be projected is given by the following equation:

$$B = c(E_T T E_R R)$$

wherein $c$ is the constant depending on the $f$ number of projection lens, the constant of elements of optical system and the arrangement thereof. In a case where only transmission light is utilized for the projection, it follows that $E_R$ is zero. Accordingly, the B becomes to be proportional to the T, so that a negative picture obtained by a conventional development process can afford only a negative image. In a case where only reflection light is utilized therefor, it follows that $E_T$ is zero. Accordingly, the B becomes to be proportional to the R and a negative picture obtained by a conventional development process can afford only a positive image upon the reversal thereof. Therefore, there may be obtained a desired contrast ranging from negative to positive, if the ratio of $E_R$ to $E_T$ is properly varied. Now, regarding "gamma" and K (equal to $E_T/E_R+E_T$) as the numeral values for representing the contrast and the ratio of $E_T$ to $E_R$, respectively in the order described, the relations between the gamma and the K are shown by the following table which is based on a number of examples:

TABLE

| K | Gamma |
|---|---|
| 0 | −0.5 |
| 0.33 | −0.25 |
| 0.61 | 0.0 |
| 0.84 | 0.25 |
| 1.00 | 0.5 | wherein a gamma of negative characteristic is considered to be plus and a gamma of positive characteristic minus.

The photographic picture image exhibiting improved metallic gloss and manufactured according to this invention, has hereinbefore been described in detail, and it displays the following advantages:

(1) It is easy to obtain a positive picture image exhibiting a desirable tone even from a photographic printing paper or a positive film having a contrast of only one sort, if any of photographic picture images having both an object contrast varying over a wide range and a metallic gloss, is employed (as an original image).

(2) Prevision to printing of a negative picture image onto a photographic printing paper, it is possible to previously know the composition of said picture image, because it can be viewed in the form of a positive picture image upon reversal thereof.

(3) Since a contrast of a particular portion of a picture image can be selectively varied by means of either transmission illumination or reflection illumination which is directed only to said particular portion, contrasts of individual picture images in whole the picture image are rendered uniform or well balanced in relation to one another, by making a contrast level of one portion of the picture image equal to that of the other portion.

The present invention will now be more closely illustrated by the following examples, three of which being concerned with a method of preparing photosensitive materials having a high silver content, and the fourth a method of imparting metallic gloss thereto.

(1) A light sensitive film is prepared in the manner of vacuum evaporation as follows: A silver halide such as silver chloride, silver bromide and silver iodide which serves as a light sensitive material, is placed on a molybdenum plate serving as also a heating element and located within a vacuum container of a vacuum evaporation apparatus generally known in the art. A substrate made of paper, triacetate film, polyester film, etc. is so located at a level above, nearly 20 cm. apart from an evaporation source that the surface thereof is opposite to the evaporation source. Thereafter, an oil diffusion pump is operated so as to make the system under reduced pressure. The evaporation source is gradually heated to a temperature of about 500° C. and the evaporation of silver halide is continued for a period of time ranging from 1 minute to 20 minutes, to produce photosensitive materials having a very high content of silver and free of binder.

(2) A light sensitive film is prepared in the manner of precipitation process, as follows: To a solution (A) composed of 4.5 g. of potassium bromide, 2.25 g. of gelatin and 30 cc. of water and heated to 60° C. there is added dropwise a solution (B) composed of 5.63 g. of silver nitrate and 30 cc. of distilled water and heated to 60° C. with stirring in a dark room. The resulting blend is left to stand at 60° C. for further 30 minutes, poured down in a flat dish, and chilled to set over ice. After cutting into fragments they are washed with water over three hours and are dissolved in 400 cc. of distilled water maintained at 55° C. with stirring to prepare an emulsion. The emulsion is poured down onto the surface of a substrate, and left standing as it is, to precipitate silver bromide thereon. A gelatin-containing liquid mass remained on the substrate is removed, and the substrate is dried into a photosensitive material having a very high content of silver.

(3) A photosensitive material prepared by an ordinary process is immersed in 10% sulfuric acid, left to stand at 25° C. for four hours to remove gelatin therefrom, washed with water for approximately 30 minutes, and dried to obtain a light sensitive material having a very high content of silver.

(4) Photosensitive materials having a very high content of silver and produced in accordance with three methods just stated is subjected to a series of ordinary photographic proceeding, such as development, fixing, washing, drying etc., after being exposed to light from an object to be taken. The picture image thus formed thereon is polished with buff and glass beads below 50 microns in size. With a polishing pressure of 20–10 g./sq. cm., the picture image is polished repeatedly, viz., 50 times, thereby said picture image becomes to exhibit good metallic gloss.

We claim:

1. Method of manufacturing materials having a photographic image which has a high reflectance at a portion exhibiting a high transmission density, comprising the steps of:
   (A) forming a picture image on the surface of a photosensitive material having a very high content of silver;
   (B) polishing the surface of said photosensitive material carrying said picture image such that a picture image having a contrast varying over a wide contrast range up to the reversal is projected onto the surface of a screen through composite illumination light which results from both transmission light and reflection illumination light directed toward said picture image; while
   (C) controlling the ratio of light intensity of the transmission illumination light to the reflection illumination light.

References Cited

UNITED STATES PATENTS 2,748,649   6/1956   Orlando.

NORTON ANSHER, Primary Examiner

RICHARD A. WINTERCORN, Assistant Examiner

U.S. Cl. X.R.

355—66, 71, 132